United States Patent
Saito (10) Patent No.: US 9,749,530 B2
(45) Date of Patent: Aug. 29, 2017

(54) INTERCHANGEABLE LENS OPERABLE IN REDUCED POWER MODES, IMAGE CAPTURING APPARATUS AND STORAGE MEDIUM STORING CONTROL PROGRAM

(71) Applicant: CANON KABUSHIKI KAISHA, Tokyo (JP)

(72) Inventor: Naoki Saito, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 16 days.

(21) Appl. No.: 14/870,553

(22) Filed: Sep. 30, 2015

(65) Prior Publication Data
US 2016/0100105 A1    Apr. 7, 2016

(30) Foreign Application Priority Data

Oct. 6, 2014  (JP) .................................. 2014-205835
Sep. 17, 2015  (JP) .................................. 2015-184359

(51) Int. Cl.
*H04N 5/232* (2006.01)
*G03B 17/14* (2006.01)

(52) U.S. Cl.
CPC ......... *H04N 5/23241* (2013.01); *G03B 17/14* (2013.01); *H04N 5/23209* (2013.01); *G03B 2217/007* (2013.01)

(58) Field of Classification Search
CPC ........... H04N 5/23241; H04N 5/23209; G03B 17/14; G03B 2217/007
See application file for complete search history.

(56) References Cited

U.S. PATENT DOCUMENTS

| 5,612,804 | A | * | 3/1997 | Hara | ................ | G02F 1/1345 |
| | | | | | | 349/149 |
| 2007/0166027 | A1 | * | 7/2007 | Misawa | ............. | H04N 5/23209 |
| | | | | | | 396/529 |
| 2009/0284643 | A1 | * | 11/2009 | Shibuno | ................ | G03B 13/00 |
| | | | | | | 348/347 |
| 2013/0055001 | A1 | * | 2/2013 | Jeong | ................... | G06F 1/3228 |
| | | | | | | 713/323 |
| 2013/0308934 | A1 | * | 11/2013 | Yamanaka | ............. | G03B 13/34 |
| | | | | | | 396/133 |

FOREIGN PATENT DOCUMENTS

JP    2000019618 A    1/2000

* cited by examiner

*Primary Examiner* — Gevell Selby
(74) *Attorney, Agent, or Firm* — Rossi, Kimms & McDowell LLP (57) ABSTRACT

The interchangeable lens is detachably attachable to an image capturing apparatus. The lens includes an electronic display to display information, and a lens controller to control an operation of the lens. The lens controller is capable of setting an operation state of the lens to a normal operation state where the interchangeable lens communicates with the image capturing apparatus and displays the information on the electronic display and to a first low power consumption state in which the interchangeable lens displays the information on the electronic display with a power consumption of the interchangeable lens lower than that in the normal operation state. The lens controller transfers the operation state from the normal operation state to the first low power consumption state, in response to receipt of a power lowering instruction for lowering the power consumption of the interchangeable lens from the image capturing apparatus.

8 Claims, 3 Drawing Sheets

INTERCHANGEABLE LENS OPERABLE IN REDUCED POWER MODES, IMAGE CAPTURING APPARATUS AND STORAGE MEDIUM STORING CONTROL PROGRAM

BACKGROUND OF THE INVENTION

Field of the Invention

The present invention relates to an interchangeable lens and particularly to a power saving technique for the interchangeable lens including an external display.

Description of the Related Art

Image capturing apparatuses, such as digital cameras, have a power saving function of transitioning to a low power consumption state (power saving mode) when no operation has been performed by a user in a normal operation state for a predetermined time period. In image capturing systems including a lens-interchangeable image capturing apparatus and an interchangeable lens, when the image capturing apparatus transitions to the low power consumption state, the image capturing apparatus sends, to the interchangeable lens, a transition instruction to instruct a transition to the low power consumption state. Upon receipt of the transition instruction, the interchangeable lens transitions from the normal operation state to the low power consumption state. For instance, when the interchangeable lens includes an external display (hereinafter referred to as "a lens external display") that displays information on the image capturing system, the interchangeable lens transitions, in its transition to the low power consumption state, the lens external display from a display state to a non-display state.

As a power saving method in the image capturing apparatus, Japanese Patent Laid-Open No. 2000-19618 discloses a method that, when the image capturing apparatus including the external display is in a normal position that allows the user to easily view the external display, sets a period of time for which illumination of the external display is continued.

The above-described transition of the lens external display from the display state to the non-display state approximately simultaneous with the transition of the image capturing apparatus to the low power consumption state prevents the user checking the above-described information on the lens external display without operating the image capturing apparatus from viewing the information. In order to view the information again on the lens external display, the user is required to perform an operation of some kind on the interchangeable lens or the image capturing apparatus to return the interchangeable lens or the entire image capturing system to its normal operation state. This requirement of frequently performing the above-described return operation for the transition to the normal operation state due to the transition of the lens external display to the non-display state decreases usability of the image capturing system.

SUMMARY OF THE INVENTION

The present invention provides an external-display-equipped interchangeable lens capable of improving usability of an image capturing system while achieving power saving.

The present invention provides as an aspect thereof an interchangeable lens detachably attachable to an image capturing apparatus. The interchangeable lens includes an electronic display configured to display information, and a lens controller configured to control an operation of the interchangeable lens. The lens controller is configured to be capable of setting an operation state of the interchangeable lens to a normal operation state in which the interchangeable lens communicates with the image capturing apparatus and displays the information on the electronic display and to a first low power consumption state in which the interchangeable lens displays the information on the electronic display with a power consumption of the interchangeable lens lower than that in the normal operation state. The lens controller is configured to transfer the operation state from the normal operation state to the first low power consumption state, in response to receipt of a power lowering instruction for lowering the power consumption of the interchangeable lens from the image capturing apparatus.

The present invention provides as another aspect thereof an image capturing apparatus configured to allow a detachable attachment of the above interchangeable lens. The image capturing apparatus includes a timer configured to count a duration time of a non-operated state in which no operation is performed on the image capturing apparatus, and an instructor configured to send a power lowering instruction to the interchangeable lens in response to an increase of the duration time to a predetermined time period.

The present invention provides as yet another aspect thereof a non-transitory computer-readable storage medium storing a computer program configured to cause a computer in an interchangeable lens to execute processes, the interchangeable lens being configured to be detachably attachable to an image capturing apparatus and including an electronic display configured to display information. The processes include a process to set an operation state of the interchangeable lens to a normal operation state in which the interchangeable lens communicates with the image capturing apparatus and displays the information on the electronic display, and a process to transfer the operation state from the normal operation state to a first low power consumption state in which the interchangeable lens displays the information on the electronic display with a power consumption of the interchangeable lens lower than that in the normal operation state, in response to receipt of a power lowering instruction for lowering the power consumption of the interchangeable lens from the image capturing apparatus.

Further features and aspects of the present invention will become apparent from the following description of exemplary embodiments with reference to the attached drawings.

DESCRIPTION OF THE EMBODIMENTS

Exemplary embodiments of the present invention will be described below with reference to the attached drawings.

Embodiment 1

Figure 1:
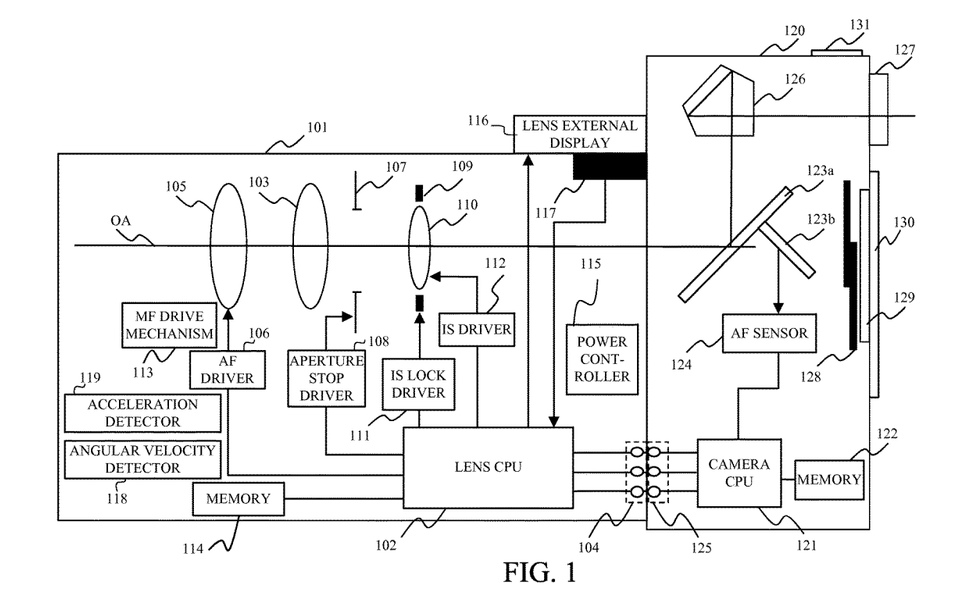
FIG. 1 is a block diagram illustrating a configuration of an image capturing system including an interchangeable lens that is an embodiment of the present invention.

FIG. 1 illustrates a configuration of an image capturing system including an interchangeable lens 101 that is a first embodiment (Embodiment 1) of the present invention and a single-reflex digital camera (hereinafter referred to as "a camera body") 120 as an image capturing apparatus to which the interchangeable lens 101 is detachably attached.

The interchangeable lens 101 is mechanically and electrically connected to the camera body 120 via a mount (not illustrated). The camera body 120 is provided with a camera CPU 121 thereinside, and the interchangeable lens 101 is provided a lens CPU 102 thereinside. The camera CPU 121 and the lens CPU 102 can, in their mutual communication, send and receive information, data and the like therebetween via communication terminals 125 and 104 provided to the mount. For instance, the camera CPU 121 sends, to the lens CPU 102, drive instructions to drive a focus lens and an aperture stop described later and a transition instruction to instruct a transition to a low power consumption state.

On the other hand, the lens CPU 102 sends, to the camera CPU 121, optical information and characteristic information of the interchangeable lens 101. The optical information shows a focal length, an aperture value, a focus sensitivity, a focus correction amount and others, and the characteristic information shows a maximum communication speed, a fully-opened aperture value, whether or not the interchangeable lens 101 is a zoom lens, an image height range within which autofocus can be performed and others. The optical information and the characteristic information are stored in a lens microcomputer 114. The camera CPU 121 acquires the optical information and the characteristic information of the interchangeable lens 101, which enables appropriately performing the autofocus (AF), automatic exposure (AE) control, image correction and others. The interchangeable lens 101 receives power from the camera body 120 through power terminals (not illustrated) provided to the mount.

The interchangeable lens 101 includes an image capturing optical system and a drive control system (constituted by the lens CPU 102, a memory 114, drivers 106, 108 and 112 and other components).

The image capturing optical system includes, in order from an object side, a focus lens unit 105, a magnification-varying lens unit 103, an aperture stop 107 and an image stabilization lens unit 110 along an optical axis OA. The image capturing optical system causes light from an object to form an object image. Although each of the lens units is illustrated as a single lens in the drawing, each of them is actually constituted by one or multiple lenses.

The focus lens unit (hereinafter simply referred to as "a focus lens") 105 is moved in a direction along the optical axis OA during the AF by an AF driver 106 including a focus actuator, such as a stepping motor, to perform focusing. The AF driver 106 is controlled by the lens CPU 102 receiving the focus lens drive instruction from the camera CPU 121. In addition, the focus lens 105 is moved during manual focusing (MF) by a manual operation by the user via an MF drive mechanism 113 including an operating member to perform focusing.

The magnification-varying lens unit 103 is moved by a manual operation of the user via a zoom driver including an operating member, such as a manual zoom ring (not illustrated), in the direction along the optical axis OA to change the focal length of the image capturing optical system (that is, performs variation of magnification).

The aperture stop 107 forms an aperture whose diameter (aperture stop diameter) is varied by the aperture driver 108 including an actuator, such as a stepping motor, to control an amount of the light entering an image sensor 129 provided to the camera body 120. The aperture driver 108 is controlled by the lens CPU 102 receiving the aperture stop drive instruction from the camera CPU 121.

The image stabilization lens 110 is moved in a direction orthogonal to the optical axis OA by an image stabilization (IS) driver 112 including an IS actuator, such as a voice coil motor, to reduce image blur due to hand jiggling. "The direction orthogonal to the optical axis OA" includes a direction oblique to the optical axis OA and a direction drawing an arc about a point on the optical axis OA as long as the directions contain a component of the direction orthogonal to the optical axis OA. A drive amount of the image stabilization lens 110 is set depending on outputs from an angular velocity detector 118 and an acceleration detector 119 both included in the interchangeable lens 101. An IS lock driver 111 drives a lock actuator, such as a stepping motor, when image stabilization is not being performed, in order to fix the image stabilization lens 110 to a lock position where an optical axis of the image stabilization lens 110 is located on the optical axis OA of the image capturing optical system.

The lens external display 116 as an electronic display is attached onto an outer circumferential surface of the interchangeable lens 101 and constituted by a liquid crystal panel, an organic electroluminescence (EL) panel or the like. The lens external display 116 displays various kinds of information on the interchangeable lens 101, the camera body 120 and image-capturing accessories (not illustrated) connectable to the interchangeable lens 101 and the camera body 120 (that is, to the image capturing system). Examples of the information to be displayed on the lens external display 116 include the focal length, the aperture value, a focus mode (AF/MF), a state (ON/OFF) of an image stabilization correction mode, and names (model numbers) of the camera body 120 and the image-capturing accessories currently connected to the interchangeable lens 101.

The lens external display 116 is provided with a touch sensor 117. Any touch operation performed on the lens external display 116 by the user with his/her finger or the like is detected by the touch sensor 117. The touch sensor 117 inputs a result of the detection to the lens CPU 102.

The power controller 115 generates, from power supplied from the camera body 120, electric powers required to operate the lens CPU 102, the AF drivers 106, the aperture stop driver 108, the IS lock driver 111, the IS driver 112, the lens external display 116 and the touch sensor 117 and supplies the electric powers thereto.

As described later, in this embodiment, in response to receipt of the transition instruction from the camera CPU 121 to instruct the transition to the low power consumption state, the lens CPU 102 causes the interchangeable lens 101 to transition from the normal operation state to the first low power consumption state. Specifically, the lens CPU 102 controls the power controller 115 to lower the powers that have been continuously supplied from the power controller 115 to components of the interchangeable lens 101 and to shut off the power supply. On the other hand, the lens CPU 102 limits its operation to decrease its power consumption.

In the first low power consumption state, the lens CPU 102 does not shut off the power supply to the lens external display 116. Instead, the lens CPU 102 lowers the supplied power to less than that in the normal operation state or supplies a power whose level is substantially the same as that supplied in the normal operation state.

In lowering the supplied power to less than that in the normal operation state, the lens CPU 102 lowers the power supplied to the lens external display 116 from a power intended for normal display that allows the lens external display 116 to clearly display information to a power intended for low power display. The power intended for the low power display refers to a minimum power required to maintain display of the information or a power whose level is close to that of the minimum required power.

For instance, when the lens external display 116 is constituted by a liquid crystal panel with backlight, the normal operation state is a state in which the backlight is brightly lit to increase a recognizability of the information being displayed. On the other hand, the first low power consumption state is a state in which the backlight is lit less brightly than in the normal operation state to lower the power consumption. In this state, the recognizability is low, but still sufficient for the user to view the displayed information. When the lens external display 116 is constituted by the organic EL panel, the normal operation state is a state in which a display luminance (light emission luminance) is increased to raise the recognizability of the displayed information. On the other hand, the first low power consumption state is a state in which the display luminance is lowered compared to that in the normal operation state to lower the power consumption. In this state, the recognizability is low, but still sufficient for the user to view the displayed information.

When the lens CPU 102 does not change the power supplied to the lens external display 116, the lens CPU 102 lowers, in the low power consumption state, the power consumption of the components in the interchangeable lens 101 other than the lens external display 116 to less than that in the normal operation state. For instance, in the first low power consumption state, the lens CPU 102 only displays causes the lens external display 116 to perform information display and shuts off the power supply to the AF driver 106, the aperture stop driver 108 and the other components. Alternatively, the first low power consumption state may be a state in which the power consumption of at least one component among the AF driver 106, the aperture stop driver 108, the image stabilization driver 112, the angular velocity detector 118, the acceleration detector 119 and the lens CPU 102 is lowered to less than that in the normal operation state. That is, the first low power consumption state is a state in which the display of the lens external display 116 is continued (maintained) with the power consumption of the entire interchangeable lens 101 being lowered compared to that in the normal operation state.

Furthermore, the lens CPU 102 counts an elapsed time from the switching from the normal operation state to the first low power consumption state. In response to an increase of the elapsed time to a predetermined time period, that is, the predetermined time period having elapsed (with the return operation described later having not been performed), the lens CPU 102 causes the interchangeable lens 101 to transition to a second low power consumption state in which the power consumption is further lowered via the power controller 115. In the second low power consumption state, the power supply to the lens external display 116 is shut off, which discontinues the information display on the lens external display 116.

As described above, in response to the receipt of the transition instruction from the camera CPU 121 to instruct the transition from the normal operation state to the low power consumption state, the lens CPU 102 causes the operation state of the interchangeable lens 101 to transition to the first low power consumption state without causing the operation state of the lens external display 116 to immediately transition to the non-display state. This enables preventing the operation state of the lens external display 116 from repeatedly changing between the display state and the non-display state even when the lens CPU 102 frequently receives the transition instruction from the camera CPU 121 instructing the transition to the low power consumption state.

In the following description, the transition instruction that is sent from the camera CPU 121 to the lens CPU 102 and instructs the transition to the low power consumption state is referred to as "a lens power save instruction" as the power lowering instruction. In addition, the normal operation state of the interchangeable lens 101 is referred to as "a lens normal operation mode", and the first low power consumption state of the interchangeable lens 101 is referred to as "a first lens power save mode". Furthermore, the second low power consumption state is referred to as "a second lens power save mode". The operation state of the lens external display 116 is a normal display state in the lens normal operation mode and is the non-display state in the second lens power save mode. In the first lens power save mode, the operation state of the lens external display 116 is the normal display state or a low power display state whose power consumption is less than that in the normal display state.

The lens CPU 102 and the power controller 115 constitute a lens controller. Although this embodiment will describe a case where the power controller 115 is provided outside the lens CPU 102, the power controller 115 may be included inside the lens CPU 102.

The lens CPU 102 is constituted by a microcomputer. The lens CPU 102 controls the operations of the components of the interchangeable lens 101 while communicating with the camera CPU 121. The lens CPU 102 stores, in its internal memory (not illustrated), a computer program and data of parameters that are to be used for the control.

The interchangeable lens 101 is provided with an AF/MF switch that selects the AF or the MF and an IS switch that selects whether or not to perform an image stabilization operation for driving the image stabilization lens 110. A selection signal depending on operations of these switches is input to the lens CPU 102 and sent to the camera CPU 121.

The camera body 120 is provided with the camera CPU 121, a camera memory 122, a main mirror 123a, a sub-mirror 123b, a finder optical system (denoted by reference numerals 126 and 127), a shutter 128, an image sensor 129, a back display 130 and a release button 131. The camera body 120 is provided also with a power switch (not illustrated).

As illustrated in FIG. 1, the main mirror 123a and the sub-mirror 123b are configured to be rotatable so as to change their state between a mirror-down state in which they are located on the optical axis OA and a mirror-up state in which they are not located on the optical axis OA, the latter of which is not illustrated. The main mirror 123a is constituted by a half mirror. In its mirror-down state, the main mirror 123a reflects part of light from the object passing through the image capturing optical system to the finder optical system and transmits the rest of the light. In its mirror-down state, the sub-mirror 123b reflects, to the AF sensor 124, the light from the object transmitted through the main mirror 123a. Upon the main mirror 123a and the sub-mirror 123b coming into their mirror-up state, the light from the object passing through the image capturing optical system proceeds toward the shutter 128 and the image sensor 129.

Although this embodiment will describe a single-reflex camera body including the main mirror 123a and the sub-mirror 123b, a so-called mirror-less camera body may alternatively be used.

The finder optical system is constituted by a penta prism 126 and an eyepiece 127. The finder optical system allows the user to observe the light from the object reflected by the main mirror 123a (that is, the object image).

The AF sensor 124 includes an AF optical system ((not illustrated)) that causes the light reflected by the sub-mirror 123b to form paired object images. The AF sensor 124 photoelectrically converts the paired object images to produce paired object image signals. The AF sensor 124 detects (calculates) a phase difference between the paired object image signals in response to a calculation command from the camera CPU 121.

The camera CPU 121 is constituted by a microcomputer. The camera CPU 121 controls components of the camera body 120, and controls the interchangeable lens 101 while communicating with the lens CPU 102.

When the AF is selected by the AF/MF switch provided to the interchangeable lens 101, the camera CPU 121 calculates a defocus amount of the image capturing optical system from the phase difference acquired from the AF sensor 124. With this calculation, the camera CPU 121 performs focus detection by a so-called phase difference detection method. Furthermore, the camera CPU 121 calculates a movement amount of the focus lens 105 for acquiring an in-focus state and sends, to the lens CPU 102, a focus lens drive instruction containing the movement amount. According to the focus drive instruction, the lens CPU 102 controls the driver 106 to move the focus lens 105. Thereby, the AF by the phase difference detection method (phase difference AF) is performed. When the camera body is the mirror-less camera body, the phase difference AF using, as an AF sensor, multiple pixels provided to the image sensor is performed.

Upon detection of a half-press operation of the release button 131, the camera CPU 121 performs an image capturing preparation operation such as the AF described above and photometry. The camera CPU 121 calculates a drive amount of the aperture stop 107 depending on a result of the photometry acquired by a photometric sensor (not illustrated) or on the aperture value set by the user and sends the drive amount to the lens CPU 102. Depending on the drive amount, the lens CPU 102 controls the aperture stop driver 108 to drive the aperture stop 107. In addition, the camera CPU 121 calculates the shutter speed depending on the photometry result. The shutter speed may be set by the user.

In the image capturing preparation operation, the camera CPU 121 starts up a photometric timer. During the count by the photometric timer, the camera CPU 121 causes a display (not illustrated) included in the finder optical system and the back display 130 to display the calculated or set shutter speed and aperture value and an exposure level acquired from them. The shutter speed, the aperture value and the exposure level are displayed also on the lens external display 116 through the lens CPU 102. The photometric timer is updated in response to continuation of the half-press operation of the release button 131 and to an operation of an operating member such as an electronic dial or an AE lock button (both of which are not illustrated).

When the image stabilization operation is selected by the IS switch, which is provided to the interchangeable lens 101, as one to be performed, the camera CPU 121 sends an image stabilization instruction to the lens CPU 102 in response to the half-press operation of the release button 131. The lens CPU 102 controls the IS driver 111 to release the lock of the image stabilization lens 110 and controls the IS driver 112 to start the image stabilization operation.

Upon detection of a full-press operation of the release button 131, the camera CPU 121 rotates the main mirror 123a and the sub-mirror 123b so as to cause them to transition to the mirror-up state, causes the shutter 128 to perform an open-and-close operation to expose the image sensor 129, thereby performing an image capturing recording operation.

The image sensor 129 is constituted by a photoelectric conversion element, such as a CCD sensor and a CMOS sensor. The camera CPU 121 produces image data (captured image) depending on output from the image sensor 129 and stores the image data in a storage medium (not illustrated) or displays the image data on the back display 130.

The back display 130 not only displays the shutter speed, the aperture value, the exposure level and the captured image that are described above, but also has a touch panel function for selecting and setting various image capturing modes. The lens external display 116 may be provided with a touch sensor having the same function of selecting and setting the image capturing modes as that of the touch sensor 117.

In response to a turning-on operation of a power switch, the camera CPU 121 causes the camera body 120 to transition to the normal operation state (hereinafter referred to as "a camera normal operation mode") in which the camera body 120 can perform the image capturing preparation operation, the image capturing recording operation and other operations. In addition, in response to a turning-off operation of the power switch, the camera CPU 121 stops the operation of the camera body 120.

When the user has performed in the camera normal operation mode no operation for the camera body 120 or the interchangeable lens 101 for a predetermined duration time, the camera CPU 121 causes the camera body 120 to transition to the low power consumption state (hereinafter referred to as "a camera power save mode"). Meanwhile, the camera CPU 121 sends the lens power save instruction to the lens CPU 102. The camera CPU 121 serves as a timer and an instructor.

In response to receipt of the lens power save instruction, the lens CPU 102 controls the power controller 115 in the above-described manner to cause the interchangeable lens 101 to transition from the normal operation mode to the first lens power save mode and then to the second lens power save mode.

In response to the operation of the release button 131 in the camera power save mode, the camera CPU 121 returns the camera body 120 to the camera normal operation mode. Meanwhile, in response to detection of the return of the camera body 120 to the camera normal operation mode, the lens CPU 102 returns the interchangeable lens 101 from a currently set one of the first and second lens power save modes to the lens normal operation mode. Similarly, in response to the touch operation of the lens external display 116 provided to the interchangeable lens 101 and to operations of the AF/MF switch and the IS switch, the lens CPU 102 returns the interchangeable lens 101 from a currently set one of the first and second lens power save mode to the lens normal operation mode. These operations to return the camera body 120 and the interchangeable lens 101 from their power save mode to their normal operation mode are collectively referred to as "a return operation".

The camera memory 122 stores the optical information and the characteristic information of the image capturing optical system received from the interchangeable lens 101 and data of parameters and others to be used in the various image capturing modes.

Figure 2:
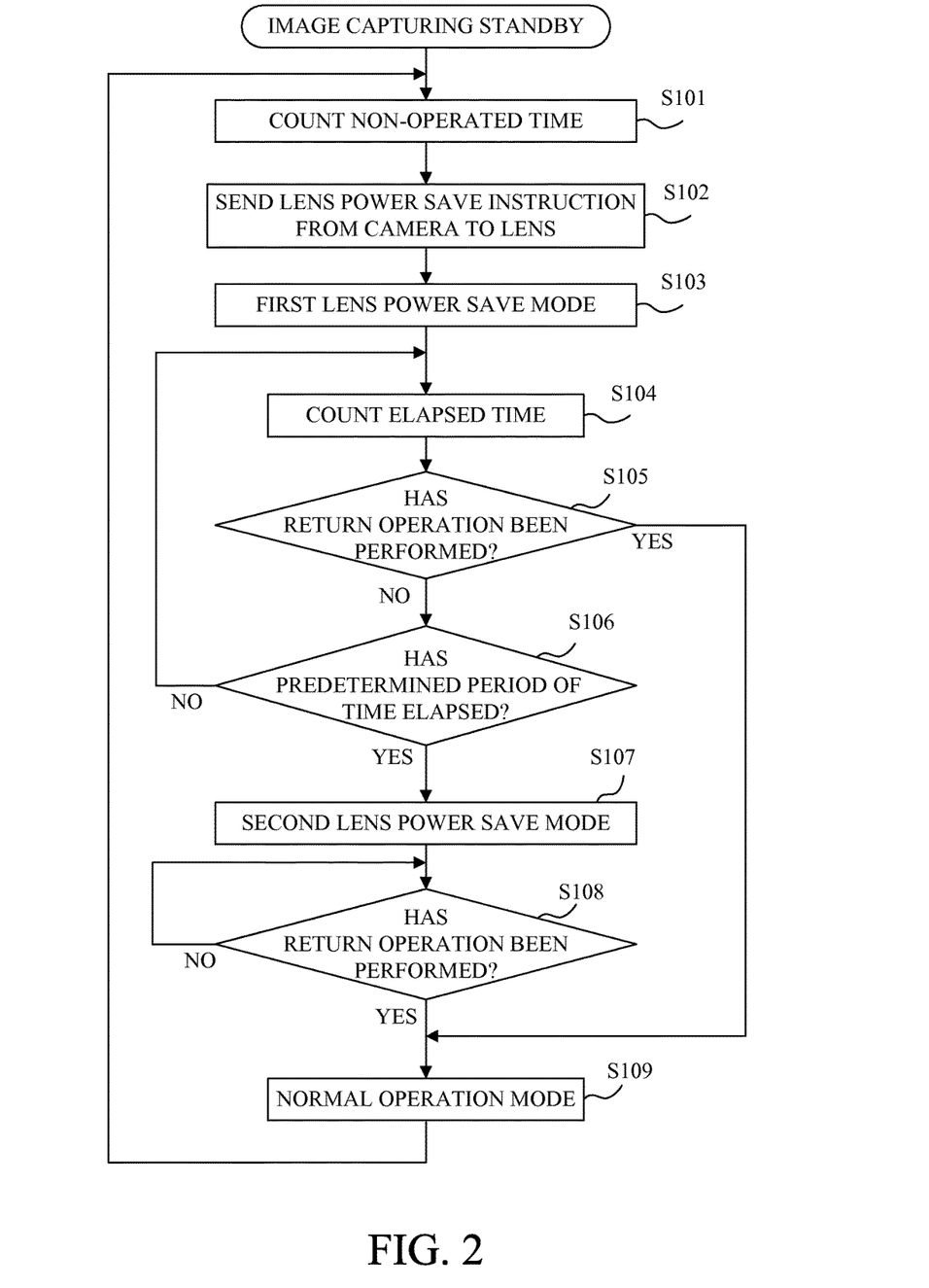
FIG. 2 is a flowchart illustrating an operation of an interchangeable lens that is Embodiment 1.

A flowchart of FIG. 2 illustrates a procedure of a power save process performed by the camera CPU 121 and the lens CPU 102. This process is executed by the camera CPU 121 and the lens CPU 102 according to a lens control program that is a computer program.

At step S101, the camera CPU 121 starts counting a duration time of a non-operated state in which no operation is performed in the camera body 120 (the duration time is hereinafter referred to as "a non-operation time"). The operation just described above includes, for example, the operation of the switch 131 and the touch operation of the back display 130. In response to an increase of the non-operation time to the above-described predetermined duration time, the camera CPU 121 proceeds to step S102.

At step S102, the camera CPU 121 sends the lens power save instruction to the lens CPU 102.

At step S103, the lens CPU 102 causes, in response to receipt of the lens power save instruction, the interchangeable lens 101 to transition from the lens normal operation mode to the first lens power save mode. Consequently, the interchangeable lens 101 transitions from its normal operation state to the first low power consumption state.

Next, at step S104, the lens CPU 102 starts counting an elapsed time from the transition to the first lens power save mode.

After starting counting the elapsed time at step S104, the lens CPU 102 determines, at step S105, whether or not the above-described return operation has been performed on at least one of the interchangeable lens 101 and the camera body 120. When determining that the return operation has been performed, the lens CPU 102 proceeds to step S109 to return the interchangeable lens 101 from the first lens power save mode to the lens normal operation mode. Meanwhile, the camera CPU 121 returns the camera body 120 from the camera power save mode to the camera normal operation mode. When determining that the return operation has not been performed, the lens CPU 102 proceeds to step S106.

At step S106, the lens CPU 102 determines whether or not the elapsed time after the transition of the first lens power save mode has increased to a predetermined time period (that is, whether or not the predetermined time period has elapsed from the transition). When determining that the elapsed time has not increased to the predetermined time period, the lens CPU 102 returns to step S105 to continue the counting of the elapsed time. When determining that the elapsed time has increased to the predetermined time period, the lens CPU 102 proceeds to step S107.

At step S107, the lens CPU 102 causes the interchangeable lens 101 to transition from the first lens power save mode to the second lens power save mode. Consequently, the lens external display 116 transitions to the non-display state.

Subsequently, after performing the return operation at step S108, the lens CPU 102 proceeds to step S109 to return the interchangeable lens 101 from the second lens power save mode to the lens normal operation mode. Consequently, the lens external display 116 transitions from the non-display state to the normal display state. On the other hand, the camera CPU 121 returns the camera body 120 from the camera power save mode to the camera normal operation mode. Thereafter, when the user has performed no operation on the camera body 120 and the interchangeable lens 101, the counting of the non-operation time of the camera CPU 121 at step S101 is started.

As described above, in this embodiment, the interchangeable lens 101 transitions to the first lens power save mode in response to the lens power save instruction from the camera body 120. In this transition, the lens external display 116 is not brought into the non-display state and thus the information display on the lens external display 116 is maintained. This allows the user to check the information displayed on the lens external display 116 while reducing power consumption in the interchangeable lens 101. This advantage can reduce a necessity of frequent return operations by the user checking the information displayed on the lens external display 116, compared to a case where the lens external display 116 is immediately brought into the non-display state in response to the lens power save instruction. Consequently, this embodiment enables realizing an image capturing system with a high usability.

Embodiment 2

Next, description will be made of a second embodiment (Embodiment 2) of the present invention. The configurations of the interchangeable lens 101 and the camera body 120 of this embodiment are identical to those in Embodiment 1, constituent elements identical to those in Embodiment 1 are denoted by the same reference numerals as those in Embodiment 1, and description thereof is omitted.

Figure 3:
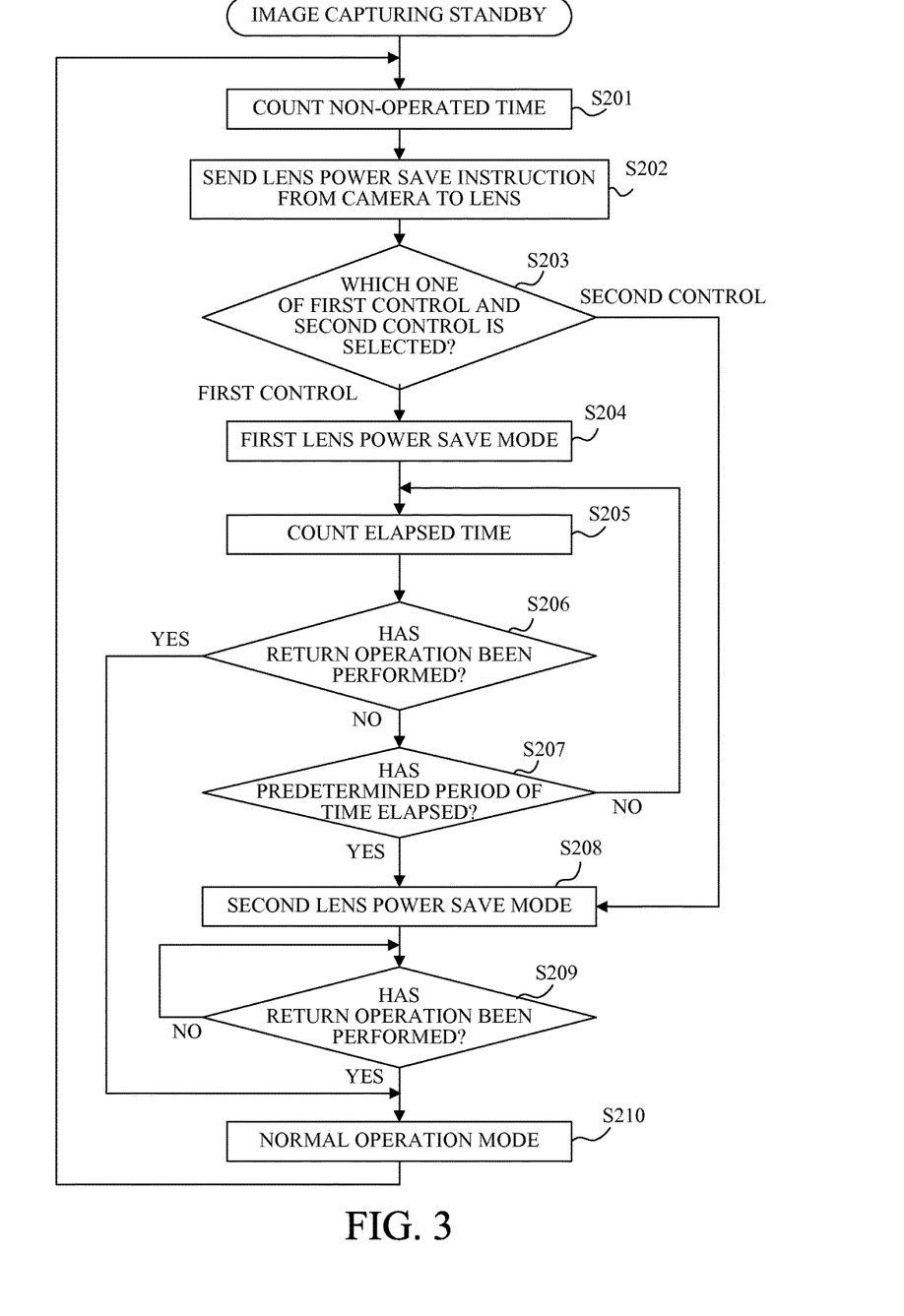
FIG. 3 is a flowchart illustrating an operation of an interchangeable lens that is Embodiment 2 of the present invention.

In this embodiment, the lens CPU 102 is capable of selectively performing a first control and a second control each being a power saving control performed in response to a lens power save instruction. The first control causes, as in Embodiment 1, the interchangeable lens 101 to transition to the second lens power save mode through the first lens power save mode. The second control causes the interchangeable lens 101 to transition to the second lens power save mode without the transition to the first lens power save mode. Selection of one of the first control and the second control can be performed through a selection operation by the user on the camera body 120. Interchangeable lenses capable of being attached to the camera body 120 include ones that do not include a lens external display 116. When the interchangeable lens 101 is such an interchangeable lens having no lens external display, the lens CPU 102 sets the second control.

A flowchart of FIG. 3 illustrates a procedure of a power save process (power saving control method) performed by the camera CPU 121 and the lens CPU 102. This process is executed by the camera CPU 121 and the lens CPU 102 according to a power saving control program that is a computer program. In this procedure, steps S201 and S202 are the same as steps S101 and S102 in Embodiment 1.

At step S203, in response to receipt of the lens power save instruction, when the interchangeable lens 101 includes the lens external display 116, the lens CPU 102 determines which one of the first control and the second control is currently selected by the user in the camera body 120. This determination is performed depending on information received from the camera CPU 121 which shows one of the first control and the second control that is currently selected. When the camera body 120 can recognize that the interchangeable lens 101 is provided with the lens external display 116, the camera CPU 121 may send, to the lens CPU 102, an instruction showing one of the first control and the second control to be executed. When the interchangeable lens 101 does not include lens external display 116, the lens CPU 102 selects (sets) the second control. The lens CPU 102 proceeds to step S204 when the first control is selected and proceeds to step S208 when the second control is selected.

Steps S204 to S210 are the same as steps S103 to S109 in Embodiment 1. When proceeding from step S203 to step S208, the lens CPU 102 causes the interchangeable lens 101 to transition from the lens normal operation mode to the second lens power save mode without the transition to the first lens power save mode.

When the first control is selected, this embodiment also allows, as in Embodiment 1, the user to check the information displayed on the lens external display 116 while reducing the power consumption in the interchangeable lens 101. This advantage can reduce a necessity of frequent return operations by the user checking the information displayed on the lens external display 116, compared to a case where the lens external display 116 is immediately brought into the non-display state in response to the lens power save instruction. Consequently, this embodiment enables realizing an image capturing system with a high usability.

Moreover, this embodiment enables selecting the second control that causes the lens external display 116 to immediately transition to the non-display state in response to the lens power save instruction. This additional advantage enables providing an image capturing system capable of performing the power saving control desired by the user and of accepting the interchangeable lens that does not includes the lens external display 116.

In each of the above embodiments, the interchangeable lens (lens CPU) transitions, in response to the receipt of the power lowering instruction from the image capturing apparatus, the operation state of the interchangeable lens from the normal operation state to the first low power consumption state in which the information can be displayed on the electronic display. This operation allows the user to check the information displayed on the electronic display while reducing the power consumption in the interchangeable lens. This advantage can reduce the necessity of frequent return operations by the user checking the information displayed on the lens external display, which enables realizing an image capturing system with a high usability.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-205835, filed on Oct. 6, 2014, and 2015-184359, filed on Sep. 17, 2015, which are hereby incorporated by reference wherein in their entirety.

What is claimed is:

1. An interchangeable lens detachably attachable to an image capturing apparatus, the interchangeable lens comprising:
   an electronic display configured to display information; and
   a lens controller configured to control an operation of the interchangeable lens,
   wherein the lens controller is configured to be capable of setting an operation state of the interchangeable lens to (a) a normal operation state in which the interchangeable lens communicates with the image capturing apparatus and displays the information on the electronic display, (b) a first low power consumption state in which the interchangeable lens displays the information on the electronic display with a power consumption of the interchangeable lens lower than that in the normal operation state, and (c) a second low power consumption state in which the interchangeable lens does not display the information on the electronic display and the power consumption of the interchangeable lens is lower than that in the first low power consumption state; and
   the lens controller is configured to selectively perform a first control and a second control in response to receipt of a power lowering instruction from the image capturing apparatus for lowering the power consumption of the interchangeable lens,
   wherein:
   in the first control, the lens controller transfers the operation state from the normal operation state to the first low power consumption state, and
   in the second control, the lens controller transfers the operation state from the normal operation state to the second low power consumption state, without transferring the operation state to the first low power consumption state.

2. The interchangeable lens according to claim 1, wherein the lens controller is configured to transfer in the first control the operation state from the first low power consumption state to the second low power consumption state, in response to lapse of a predetermined time period from the transition to the first low power consumption state.

3. The interchangeable lens according to claim 1, wherein a power required to display the information on the electronic display in the first low power consumption state is lower than a power required to display the information on the electronic display in the normal operation state.

4. The interchangeable lens according to claim 1, wherein a power consumption of at least one component among an actuator, an angular velocity detector, an acceleration detector and a microcomputer that are included in the interchangeable lens in the first low power consumption state is lower than that of the at least one component in the normal operation state.

5. The interchangeable lens according to claim 1, wherein the lens controller is configured to:
perform the first control in response to receipt of a transition instruction as the power lowering instruction to instruct a transition to the first low power consumption state; and
perform the second control in response to receipt of a transition instruction as the power lowering instruction to instruct a transition to the second low power consumption state.

6. The interchangeable lens according to claim 1, wherein the lens controller is configured to return the operation state from the first low power consumption state to the normal operation state in response to a user's operation on the interchangeable lens or the image capturing apparatus in the first low power consumption state.

7. An image capturing apparatus configured to allow a detachable attachment of an interchangeable lens, the image capturing apparatus comprising:
a timer configured to count a duration time of a non-operated state in which no operation is performed on the image capturing apparatus; and
an instructor configured to send a power lowering instruction for lowering a power consumption of the interchangeable lens to the interchangeable lens in response to an increase of the duration time to a predetermined time period,
wherein the interchangeable lens comprises:
an electronic display configured to display information; and
a lens controller configured to control an operation of the interchangeable lens,
wherein the lens controller is configured to be capable of setting an operation state of the interchangeable lens to (a) a normal operation state in which the interchangeable lens communicates with the image capturing apparatus and displays the information on the electronic display, (b) a first low power consumption state in which the interchangeable lens displays the information on the electronic display with a power consumption of the interchangeable lens lower than that in the normal operation state, and (c) a second low power consumption state in which the interchangeable lens does not display the information on the electronic display and the power consumption of the interchangeable lens is lower than that in the first low power consumption state; and
the lens controller is configured to selectively perform a first control and a second control in response to receipt of a power lowering instruction from the image capturing apparatus,
wherein:
in the first control, the lens controller transfers the operation state from the normal operation state to the first low power consumption state, and
in the second control, the lens controller transfers the operation state from the normal operation state to the second low power consumption state, without transferring the operation state to the first low power consumption state.

8. A non-transitory computer-readable storage medium storing a computer program configured to cause a computer in an interchangeable lens to execute processes, the interchangeable lens being configured to be detachably attachable to an image capturing apparatus and including an electronic display configured to display information, the processes comprising:
a process to set an operation state of the interchangeable lens to a normal operation state in which the interchangeable lens communicates with the image capturing apparatus and displays the information on the electronic display; and
a process to selectively perform a first control process and a second control process in response to receipt of a power lowering instruction from the image capturing apparatus for lowering the power consumption of the interchangeable lens,
wherein:
the first control process transfers the operation state from the normal operation state to a first low power consumption state in which the interchangeable lens displays the information on the electronic display with a power consumption of the interchangeable lens lower than that in the normal operation state, and
the second control process transfers the operation state from the normal operation state to a second low power consumption state in which the interchangeable lens does not display the information on the electronic display and the power consumption of the interchangeable lens is lower than that in the first low power consumption state, without transferring the operation state to the first low power consumption state.

* * * * *